United States Patent [19]

White et al.

[11] Patent Number: 5,044,578
[45] Date of Patent: Sep. 3, 1991

[54] UNIVERSAL CABIN SIDEWALL PANEL FOR AIRCRAFT

[76] Inventors: Thomas H. White, 26325 SE. 39th St., Issaquah, Wash. 98027; Miguel A. Remedios, 4900 222nd St. SE., Mountlake Terrace, Wash. 98043

[21] Appl. No.: 457,639

[22] Filed: Dec. 27, 1989

[51] Int. Cl.[5] .......................... B64D 11/00; B64C 1/14
[52] U.S. Cl. ................................. 244/119; 244/117 R; 244/118.5
[58] Field of Search ............... 244/119, 117 R, 118.5, 244/129.1, 129.4; 52/222; 49/34, 40; 160/87, 88, 352

[56] References Cited

FOREIGN PATENT DOCUMENTS 278620 8/1988 European Pat. Off. ............ 244/119

Primary Examiner—Joseph F. Peters, Jr.
Assistant Examiner—James M. Kannofsky
Attorney, Agent, or Firm—R. H. Sproule; B. A. Donahue

[57] ABSTRACT

A single-size interior cabin sidewall panel fits aircraft of different sizes. The panel is fabricated so that in its "relaxed" state it has a curved configuration which requires the panel to be unbended to fit in the aircraft. Larger aircraft require more unbending of the panel than do smaller aircraft. This results in a uniform pressure across the panel which promotes a close fit between adjacent overlapping sidewall panels.

4 Claims, 5 Drawing Sheets

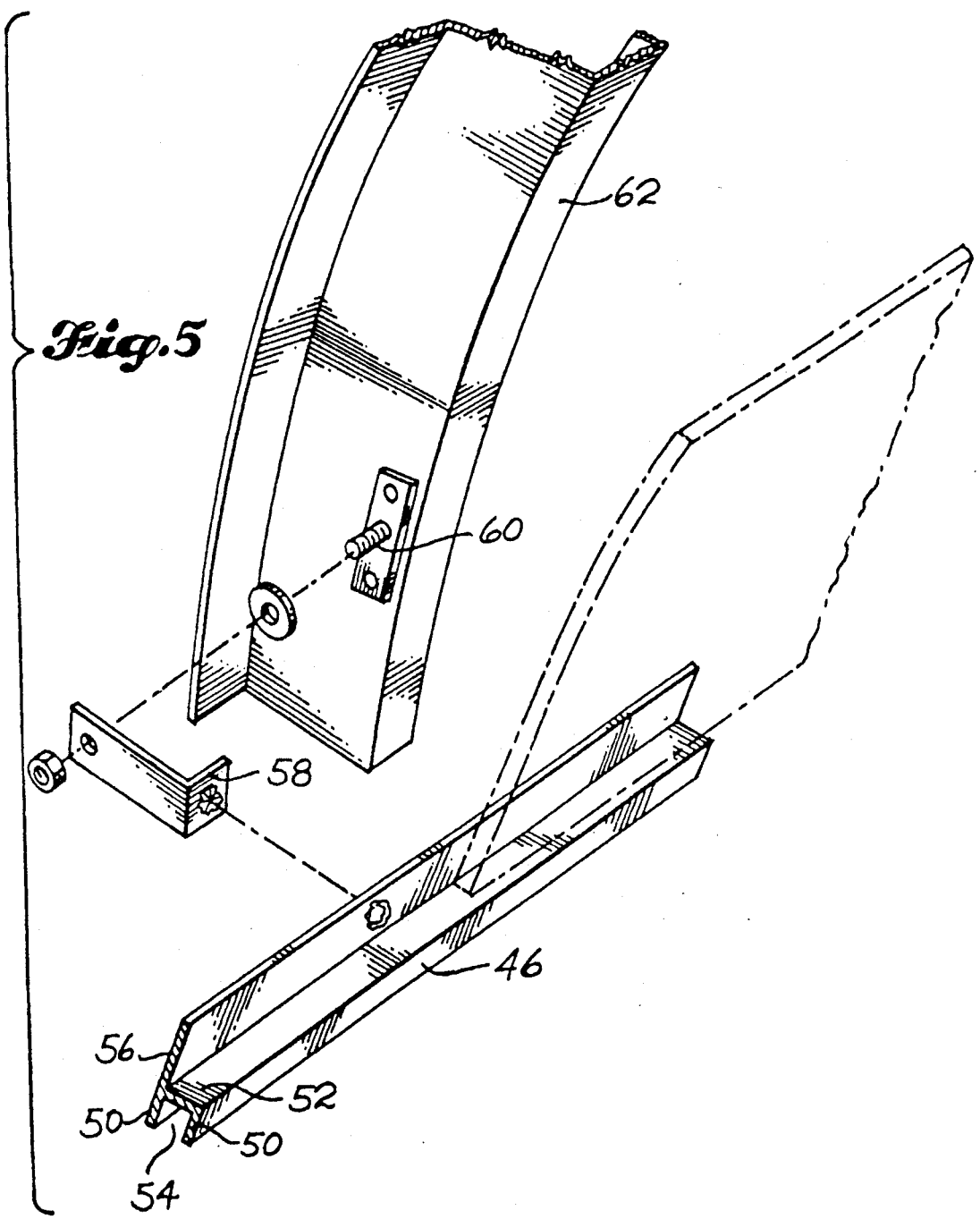

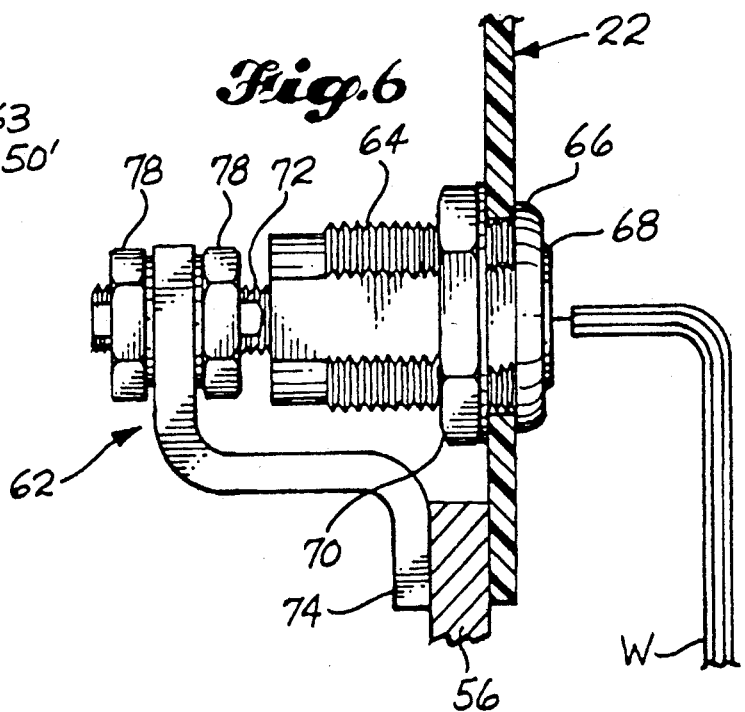
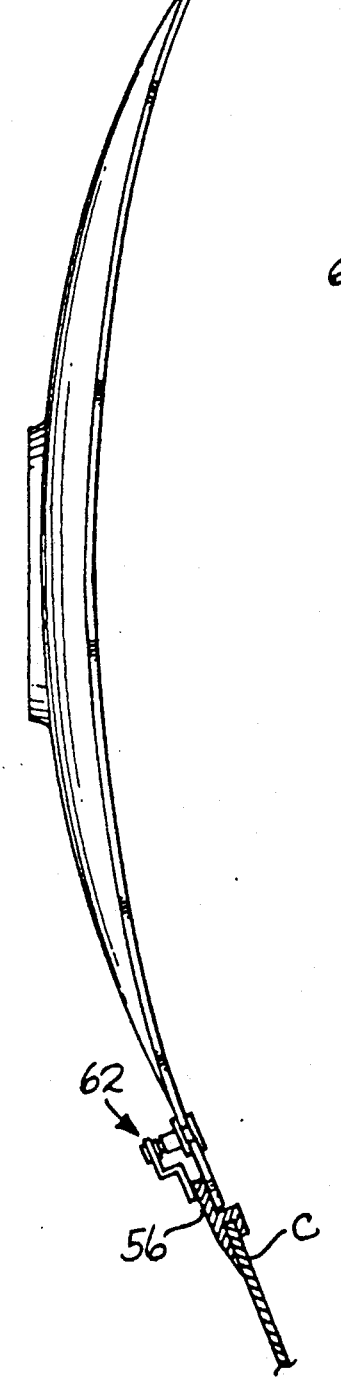
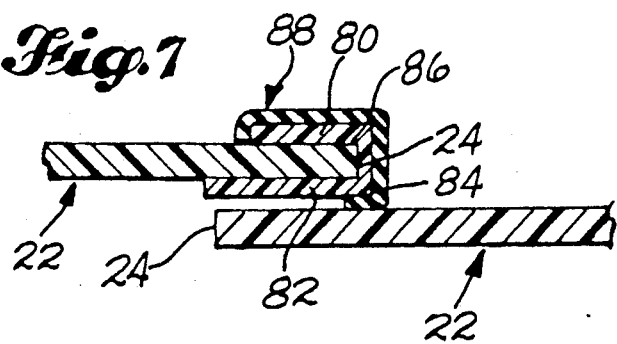

UNIVERSAL CABIN SIDEWALL PANEL FOR AIRCRAFT

TECHNICAL FIELD

The present invention pertains to a removable cabin sidewall panel which can be installed on aircraft of different sizes.

BACKGROUND OF THE INVENTION

Modern commercial aircraft have sidewall panels located in the cabin to cover the aircraft frame as well as the aircraft wiring, ducting and insulation which are located along the length of the cabin. In order to maximize efficiency, it is desirable for an aircraft manufacturer that makes a variety of different model aircraft to have a single-size cabin sidewall panel which can be installed on these various aircraft.

Some of the obstacles which prevent the use of a common aircraft sidewall panel are (1) differences between the models in cabin height, (2) differences in cabin curvature, and (3) differences in spacing between the individual frames of the different model aircraft.

It is desirable, therefore, to provide a cabin sidewall panel which overcomes these obstacles and which can be used on different size aircraft.

SUMMARY OF THE INVENTION

The present invention pertains to a cabin sidewall panel assembly for an aircraft. The panel assembly includes a number of flexible panels each having a first radius of curvature when in a "relaxed" state (when not subjected to any bending forces). Also included are means for attaching the flexible sidewall panels to the aircraft in a manner that (i) adjacent portions of flexible panels overlap, and (ii) each of the flexible sidewall panels has a second radius of curvature which is greater than the radius of curvature in the relaxed state. In this manner, the overlapping portion of the flexible panel is supported against the overlapped portion of the adjacent flexible panel so as to maintain a close fit therebetween.

The present invention provides a sidewall panel assembly which may be used in aircraft having different fuselage curvatures. In the present invention, the attaching means includes (1) means for connecting the sidewall panels to a first aircraft having a smaller fuselage curvature so that each of the sidewall panels has a radius of curvature which is greater than its radius of curvature in the relaxed state, and (2) means for connecting each sidewall panel to a second aircraft having a larger fuselage curvature so that the sidewall panel has a radius of curvature which is greater than the radius of curvature when it was attached to the first aircraft.

BRIEF DESCRIPTION OF THE DRAWINGS

These and other features of the present invention will be explained in further detail in the following detailed description and with reference to the following drawings, in which:

FIG. 4 is a side view of the exemplary sidewall panel of the present invention;

FIG. 5 is an isometric view showing attachment a portion of an h-channel to a frame of the aircraft;

FIG. 6 is a side view of a conventional fastener used with the exemplary sidewall panel of the present invention;

FIG. 7 is a partial sectional view showing the overlapping of two exemplary sidewall panels.

DETAILED DESCRIPTION

Figure 1:
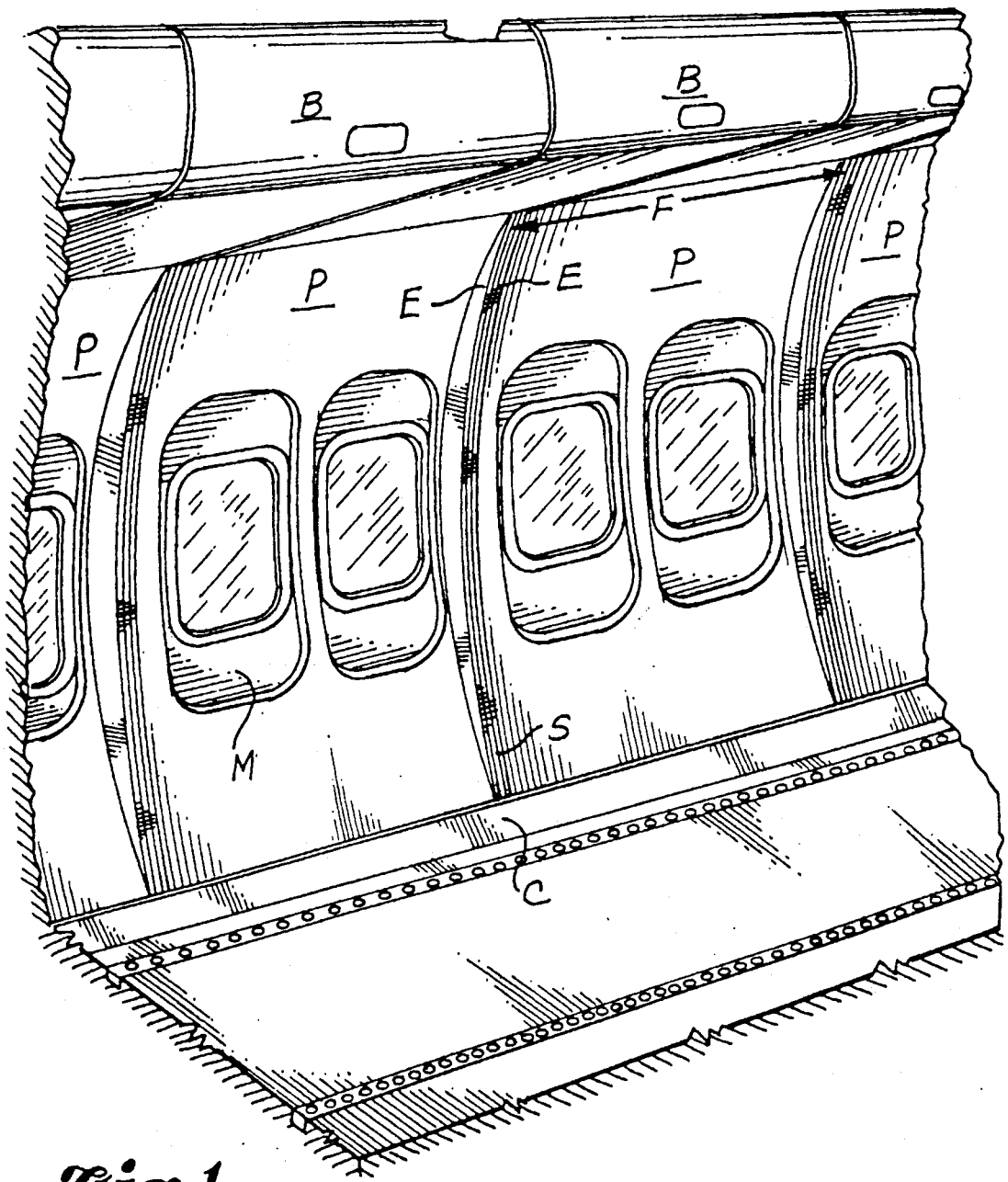
FIG. 1 is an isometric view of the inside of an aircraft cabin showing a number of conventional sidewall panels.

Before proceeding with a detailed description of the aircraft cabin sidewall panel of the present invention, a further discussion of the problems associated with conventional aircraft sidewall panels will be provided. Referring to FIG. 1 there is shown a portion of an aircraft cabin having a number of conventional side wall panels P. Located behind the sidewall panels P are a number of curved frame members (not shown) extending around the cabin which are spaced apart at locations along the length of the fuselage. This frame spacing, designated by the letter F, can vary between different model aircraft. Conventionally, a sidewall panel is sized to the dimensions of each aircraft. The conventional sidewall panel also includes left and right outside edge elements (adjacent to vertical edges E of the panel and not shown) which in turn are connected to the frame members by fasteners (also not shown). In addition, a slight gap is provided between the vertical edges E of the panels to receive a decorative spacer S which covers the fasteners.

To provide additional shoulder room for the passengers, each panel P includes a middle recessed portion M (containing the window). The maximum depth of this recessed portion M is dictated by the space existing between the inner face of the frame members and the skin of the aircraft. This depth can vary between different model aircraft.

A typical sidewall panel P is mounted so that its lower edge is located adjacent to the upper end of a carpet riser C. The sidewall panel extends upward paralleling the curvature of the fuselage and its upper edge is located near an overhead bin B. Conventionally, a sidewall panel P unique to each model aircraft was required because (i) the distance between the frame members varied between different aircraft models, and (ii) the fuselage curvature varied between different aircraft models.

Figure 2:
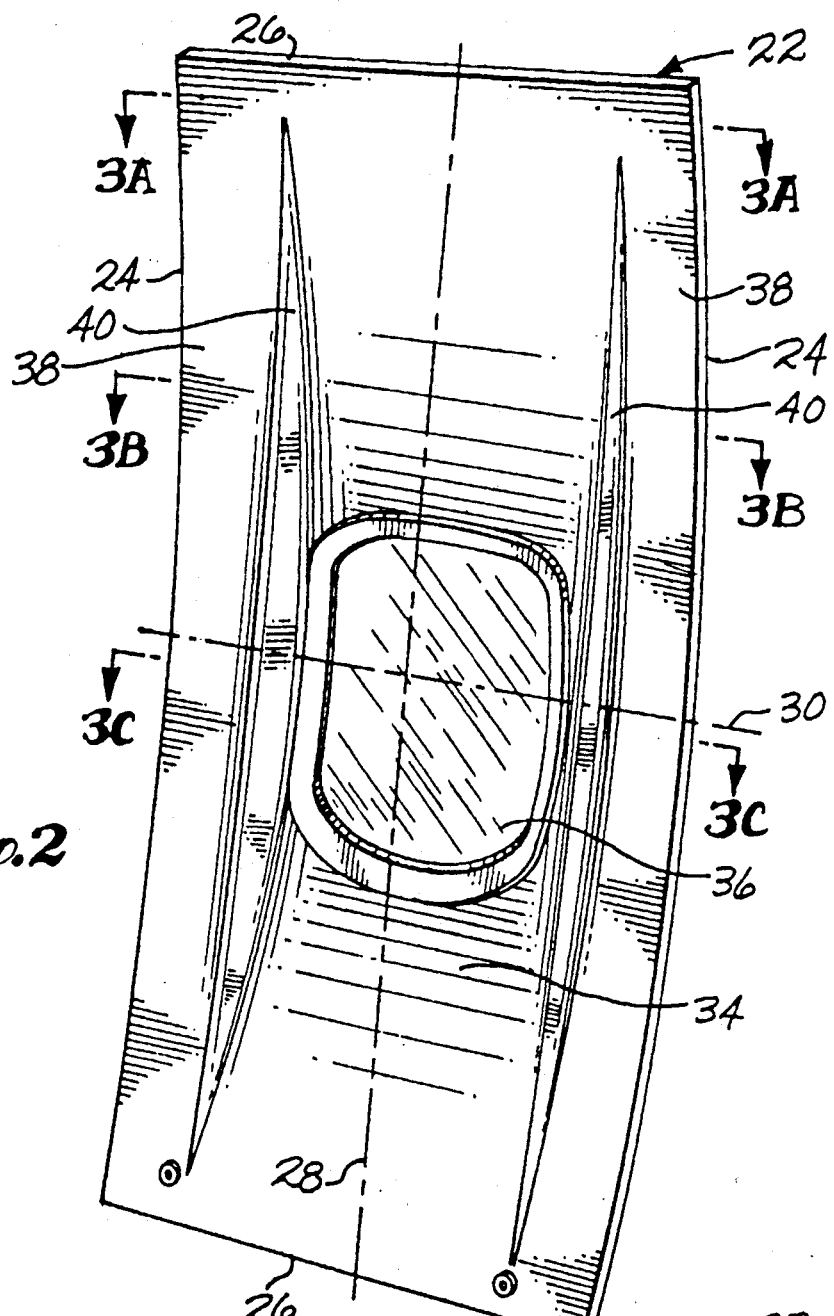
FIG. 2 is an isometric view of an exemplary sidewall panel of the present invention.

Referring now to FIG. 2 there is shown a unique cabin sidewall panel indicated at 22 having parallel left and right vertical edges 24 and parallel upper and lower horizontal edges 26. For purposes of explanation, the panel 22 includes a longitudinal axis defined by a line 28 which is parallel to the vertical edges 24 and a lateral axis defined by a line 30 which is parallel to the upper and lower edges 26. The panel 22 is further defined by (i) a recessed vertically extending middle section 34 which contains a window 36 and (ii) left, right vertical side sections 38. As shown more clearly in FIG. 2 the middle section 34 is integrally attached to the left, right side sections 38 by fairing sections 40 which provide a smooth, gradual transition between the middle section 34 and the side sections 38. For the purposes of explanation, a perpendicular distance h between the inner face of the side sections 38 (FIG. 3C) and the inner face of the middle section 34 is referred to as the "panel depth".

Figure 3A:
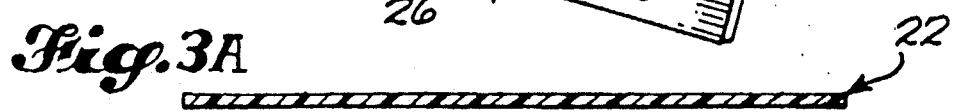
FIGS. 3A, 3B and 3C are sectional views of the exemplary sidewall panel taken along lines 3A—3A, 3B—3B and 3C—3C, respectively, of FIG. 2.
Figure 3B:
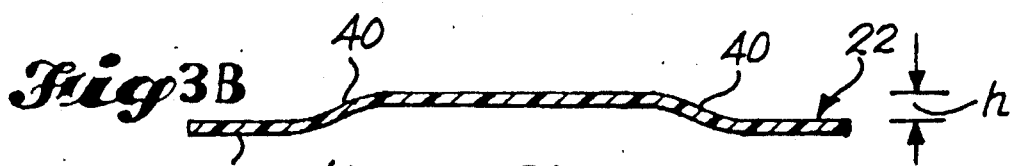
Figure 3C:
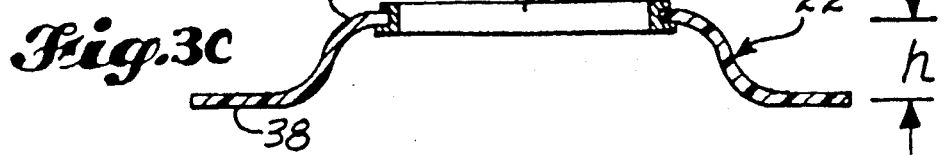

Referring to FIG. 2 in combination with FIG. 3, beginning at the upper edge 26 of the panel and proceeding downward toward the center of the panel, the panel depth increases gradually from a value of about zero (FIG. 3A) until it reaches a maximum depth at the center of the panel (FIG. 3C). Likewise, beginning at the lower edge 26 of the panel and proceeding upward to the panel center, the depth of the panel increases in the same manner.

The panel is made so that it is laterally flexible. That is, the panel is made flexible about the lateral axis 30 (FIG. 2) as well as about a number of imaginary axes which are parallel to axis 30 and which are located between the upper and lower edges 26 of the panel. In an exemplary embodiment the panel is made from a conventional honeycomb crushed core material such as Nomex, a registered trademark of Du Pont de Nemours, E.I. & Co. In order to enhance its flexibility as well as to prevent the panel from cracking when flexed, the fairings 40 have a curved configuration to join with the flat middle section 34 and flat outer edge sections 38.

In the present invention, the panel is held in place in the aircraft cabin by an upper H-channel 44 and a lower h-channel 46 as shown in FIG. 4. The lower h-channel 46 (FIG. 5) includes (i) a pair of left, right parallel vertical flanges 50 which are joined at the top by a horizontal flange 52 to form a channel 54, as well as ii) a vertical flange 56 which is connected to the top of the left vertical flange 50. The h-channel is attached via the upper flange 56 to an L-shaped bracket 58 which in turn is mounted to a stud 60 which is attached to the aircraft frame 62. In this manner the h-channel extends along the cabin in a fore and aft direction along the cabin carpet riser. As shown more clearly in FIG. 4, the lower h-channel 46 is mounted to the carpet riser C so that the channel portion fits over the upper edge of the carpet riser.

The upper H-channel 44 (FIG. 4) is similar to the lower h-channel 46 (like elements being identified by like numerals with a prime (') suffix attached), and includes a second vertical flange 63 which is connected to the top of the right vertical flange 50'. Depending on the curvature of the aircraft fuselage, the location of the upper H-channel 44 behind the stowage bin is selected so as to produce the desired curvature of the cabin sidewall panel. The upper H-channel 44 is secured to the aircraft frame in a manner similar to that of lower h-channel 46.

The cabin sidewall panel 22 is mounted to the aircraft by first inserting the upper edge of the panel in the channel portion 54' (FIG. 4) of the upper H-channel 44. The lower edge of the sidewall panel is then pushed in place against the frame and two conventional latches 62 (only one of which is shown in FIG. 4) located near the lower edge of the panel are rotated to hold the panel in place.

More specifically, each latch 62 shown in FIG. 6 includes a threaded cylindrical body 64 having a faceplate 66 which is positioned around an internal rotatable cylinder 68 which in turn includes a slot (not shown) for receiving an Allen wrench W or similar tool or the like. The body 64 is located within a hole in the panel so that the sidewall panel 22 is sandwiched between the faceplate 66 and a nut 70 mounted on the body 64. Extending axially from the body 64 is a threaded end of the rotatable cylinder 68 onto which is mounted an S-shaped pawl 74 between two jam nuts 78. A ninety degree rotation of the internal cylinder 68 by the Allen wrench causes the pawl 74 to rotate ninety degrees and simultaneously move axially toward the faceplate 66 thereby engaging the vertical flange 56 of the lower h-channel 46 between the sidewall panel 22 and pawl 74. In this manner, the bottom of the sidewall panel is quickly and conveniently fastened in place by operation of the bottom latches 62. In an exemplary embodiment, the latch 62 is a "Vise-action Latch" made by Southco Inc. of Concordville, Penn.

In order to fit aircraft in which the distance between the frames vary, in the present invention the adjacent sidewall panels 22 do not abut against a center spacer strip as described previously with regard to conventional panels. Rather, in the present invention the sides of the panels 22 overlap as shown in FIG. 7. More particularly, where two panels 22 overlap, one of the panel edges 24 includes a thin hard plastic extrusion indicated at 80. The plastic extrusion 80 includes a front integral portion 82 which is attached to the front of the panel, an edge integral portion 84 which extends around the edge 24 of the panel, and a rear integral portion 86 which is attached to the back of the sidewall panel. Attached over the plastic extrusion 80 is a soft rubber pad 88 which covers (i) part of the front portion 82 so as to engage the front surface of the adjacent overlapping sidewall panel, (ii) the edge portion 84, and (iii) the rear portion 86 of the plastic extrusion. The front portion 82 provides a seal between the panels 22 at the points where they overlap.

Figure 8:
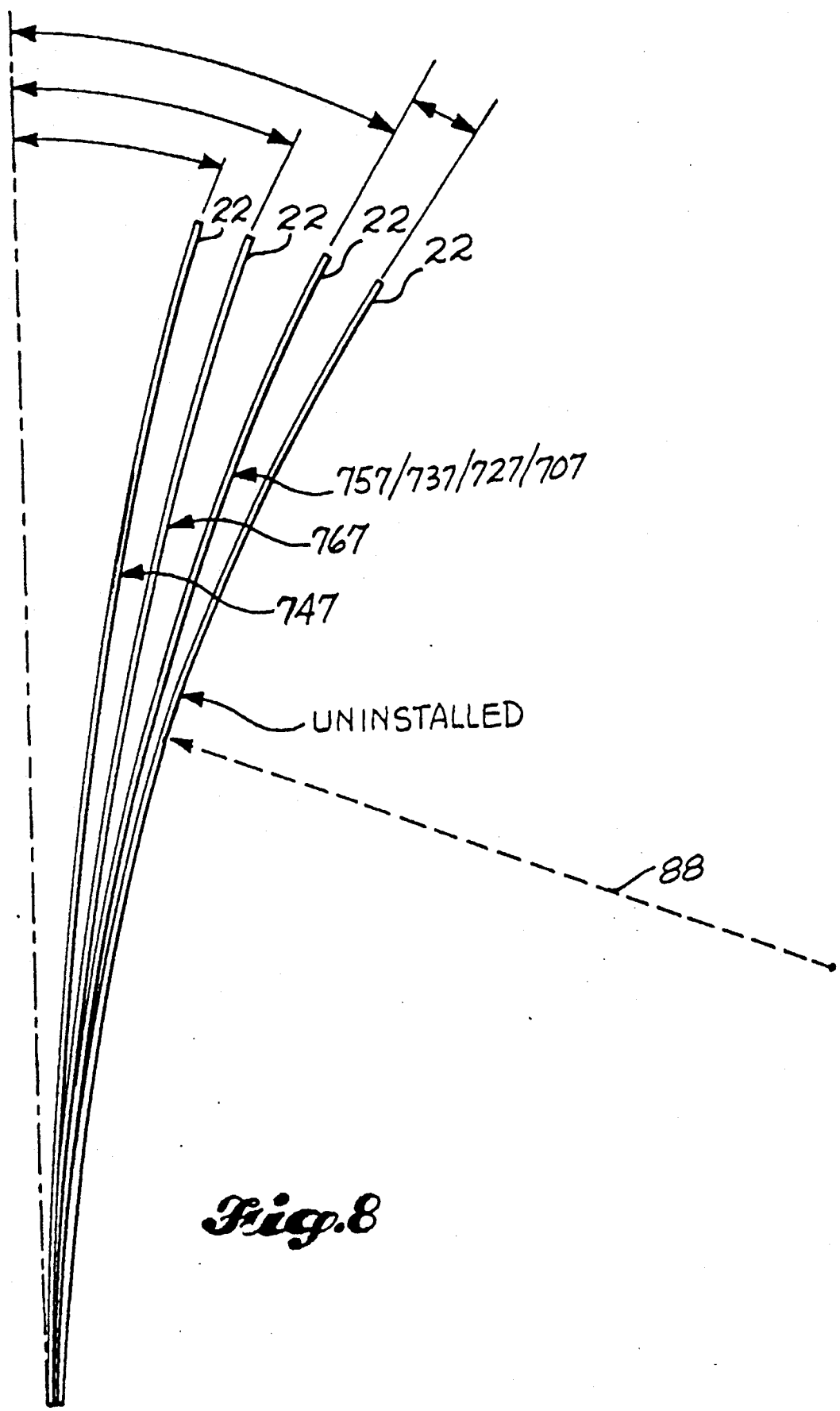
FIG. 8 shows the differing amounts of unbending required for installation of the exemplary sidewall panel in different sized aircraft.

In order to fit different sized cabins, the panel 22 is fabricated in a curved state shown in FIG. 2. More specifically, the radius of curvature of the panel (the radius shown by an arrowed dashed line designated by a number 88 in FIG. 8) is made larger (i.e., less curvature) than the radius of curvature required for any aircraft model (FIG. 8). In this manner, the panel must be unbended in order to fit within the upper H-channel and lower h-channel inside the aircraft cabin. When the sidewall panel is installed against a curved surface, such as an adjacent curved sidewall panel or a curved frame member, having a greater radius than the radius of the sidewall panel in its "uninstalled" or "relaxed" state, the panel "wants" to return to its "relaxed", more bended state. This causes the sidewall panel to lay snugly against the adjacent sidewall panel or frame member. This uniform bending pressure across the panel causes the soft rubber pad 88 (FIG. 7) to remain in contact against the adjacent panel all along the vertical edges of the sidewall panels so as to maintain a seal therebetween which is visually pleasing. However, this is not the case when the panel is manufactured conventionally in a flat or slight curved state and then made to bend further for installation in an aircraft. Installation of this conventional panel results in a panel which tends to pull away from the frame and to leave gaps between the adjacent sidewall panels which can be seen when looking along the sides of the aircraft cabin.

In an exemplary embodiment, the sidewall panel 22 is made to fit on Boeing model 707, 727, 737, 747, 757 and 767 aircraft. The panel is fabricated so that in its "relaxed" state it has the curvature shown in FIG. 8. However, when installed in the various aircraft, the panel 22 is unbended (made straighter) in varying degrees in order to fit the selected aircraft.

Another feature of the present invention is that as the panel 22 is further straightened for installation in larger aircraft (e.g. model 747), the panel depth h (FIG. 3) increases. This allows for increased passenger shoulder room in the larger aircraft and is consistent with the basic airframe design which includes larger frame-to-skin distances in the larger aircraft.

What is claimed is:

1. A sidewall panel assembly for aircraft, the assembly comprising:
    a. first and second flexible sidewall panels each having a first radius of curvature when not subjected to a bending force; and
    b. means for attaching the first and second flexible sidewall panels to the aircraft in a manner that (i) a portion of the first flexible sidewall panel overlaps a portion of the second flexible sidewall panel, and (ii) each of the attached first and second flexible panels has a second radius of curvature which is greater than the first radius of curvature so that the overlapping portion of the first flexible panel is supported against the overlapped portion of the second flexible panel in a manner to maintain a close fit therebetween.

2. The sidewall panel assembly as set forth in claim 1 wherein:
    a. the aircraft include a first aircraft having a fuselage with a second radius of curvature and a second aircraft having a fuselage with a third radius of curvature which is greater than the second radius of curvature; and
    b. the attaching means includes
        (1) means for connecting the first sidewall panel to the first aircraft so that the first sidewall panel has a radius of curvature which is equal to the second radius of curvature and which is greater than the first radius of curvature, and (2) means for connecting the first sidewall panel to the second aircraft so that the first sidewall panel has a radius of curvature which is equal to the third radius of curvature and which is greater than the first radius of curvature.

3. The sidewall panel assembly as set forth in claim 1 wherein:
    a. the first sidewall panel includes (i) a middle portion, (ii) a first side portion which is integrally connected to a side of the middle portion, and (iii) a second side portion which is integrally connected to an opposite side of the middle portion; and b. the middle portion is connected to the first and second side portions in a manner that (i) the middle portion is recessed behind the first and second side portions at a first distance when the first sidewall panel is not subjected to a bending force, and (ii) when the first sidewall panel is attached to the aircraft so that the second radius of curvature is greater than the first radius of curvature, the middle portion is recessed behind the first and second side portions at a distance which is greater than the first distance.

4. The sidewall panel assembly as set forth in claim 1 wherein:
    a. the first sidewall panel includes a first edge portion and a second edge portion which is opposite from the first edge portion; and
    b. the attaching means includes (i) channel means which are connected to the aircraft and which receive the first edge portion therein so as to support the first edge portion of the first sidewall panel, and (ii) means for fastening the second edge portion to the aircraft.

* * * * *